United States Patent
Hammerschmidt

(10) Patent No.: US 10,393,555 B2
(45) Date of Patent: Aug. 27, 2019

(54) CALIBRATION OF AN ANGLE SENSOR WITHOUT A NEED FOR REGULAR ROTATION

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 264 days.

(21) Appl. No.: 15/378,656

(22) Filed: Dec. 14, 2016

(65) Prior Publication Data

US 2018/0164131 A1 Jun. 14, 2018

(51) Int. Cl.
- *G01D 5/14* (2006.01)
- *G01D 18/00* (2006.01)
- *G01D 3/036* (2006.01)

(52) U.S. Cl.
CPC ............ *G01D 18/00* (2013.01); *G01D 3/0365* (2013.01); *G01D 5/14* (2013.01); *G01D 5/145* (2013.01)

(58) Field of Classification Search
CPC ...................................................... G01D 18/00
See application file for complete search history.

(56) References Cited

U.S. PATENT DOCUMENTS

| | | | | |
|---|---|---|---|---|
| 2005/0028614 A1* | 2/2005 | Saito | ..................... | G01D 3/0365 73/862.333 |
| 2005/0278137 A1* | 12/2005 | Hammerschmidt | ... | G01B 21/22 702/151 |
| 2005/0283988 A1* | 12/2005 | Sato | ........................ | G01C 17/38 33/356 |
| 2006/0290545 A1* | 12/2006 | Granig | ..................... | H03M 1/06 341/118 |
| 2010/0050731 A1* | 3/2010 | Granig | .................... | G01D 5/145 73/1.11 |
| 2014/0266176 A1* | 9/2014 | Fernandez | ................ | G01R 1/44 324/244 |

OTHER PUBLICATIONS

Infineon, "Angle Sensor, GMR-Based Angle Sensor, TLE5012B," User's Manual V 1.0, Sense and Control, Apr. 2014, 101 pages.
Infineon, "TLE5009, GMR-Based Angular Sensor," Application Note, TLE 5009 Calibration, V 1.0, Dec. 2010, 17 pages.

* cited by examiner

*Primary Examiner* — Manuel L Barbee
*Assistant Examiner* — Raymond L Nimox
(74) *Attorney, Agent, or Firm* — Harrity & Harrity, LLP

(57) ABSTRACT

A device may obtain raw sensor data, collected by a sensing device, including a set of signal values and a set of temperature values corresponding to the set of signal values. The set of signal values may correspond to a magnetic field present at the sensing device. The device may determine, based on the set of signal values, a first value of a calibration parameter associated with calibrating the sensing device. The device may associate, based on the set of temperature values, a particular temperature value with the first value of the calibration parameter. The device may determine, based on the particular temperature value and a temperature compensation function associated with the calibration parameter, a second value of the calibration parameter. The device may selectively update the temperature compensation function based on a comparison of the first value and the second value.

20 Claims, 7 Drawing Sheets

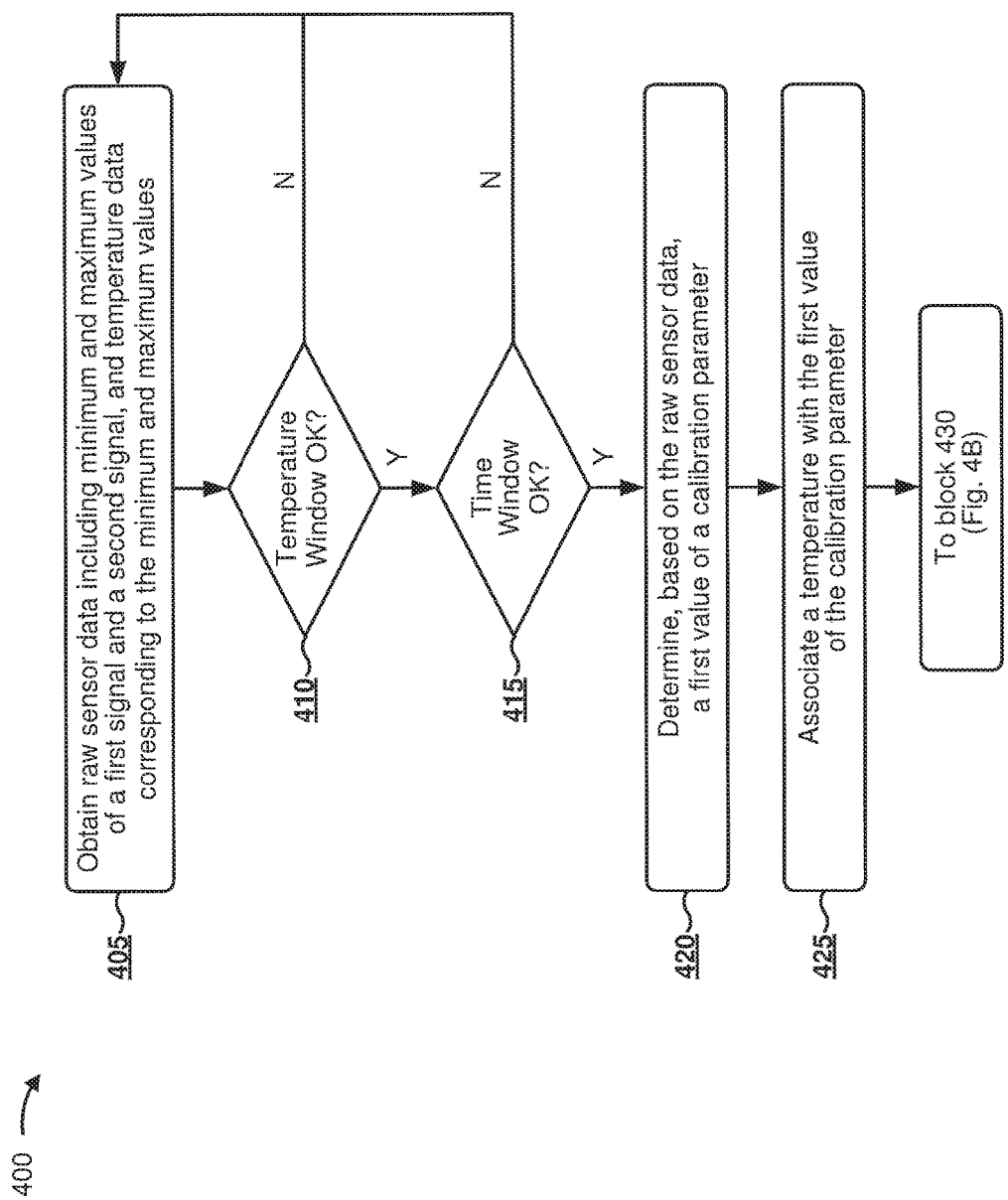

CALIBRATION OF AN ANGLE SENSOR WITHOUT A NEED FOR REGULAR ROTATION

BACKGROUND

A magnetic angle sensor may be used to determine an orientation of a magnetic field (e.g., an angle between zero degrees and three hundred and sixty degrees) produced by a magnet. The magnetic angle sensor may be a Hall-effect sensor, a magnetoresistive (MR) sensor, a variable reluctance sensor (VRS), a fluxgate sensor, or the like.

SUMMARY

According to some possible implementations, a device may include one or more processors to: obtain raw sensor data, collected by a sensing device, including a set of signal values and a set of temperature values corresponding to the set of signal values, where the set of signal values may correspond to a magnetic field present at the sensing device; determine, based on the set of signal values, a first value of a calibration parameter associated with calibrating the sensing device; associate, based on the set of temperature values, a particular temperature value with the first value of the calibration parameter; determine, based on the particular temperature value and a temperature compensation function associated with the calibration parameter, a second value of the calibration parameter; and selectively update the temperature compensation function based on a comparison of the first value and the second value.

According to some possible implementations, a method may include: obtaining, by a sensing device, a set of signal values and a set of temperatures corresponding to the set of signal values, where the set of signal values and the set of temperatures may be included in sensor data collected by the sensing device, and where the set of signal values may correspond to one or more components of a magnetic field present at the sensing device; determining, by the sensing device and based on the set of signal values, a first value of a calibration parameter associated with calibrating the sensing device; associating, by the sensing device and based on the set of temperatures, a particular temperature with the first value of the calibration parameter; calculating, by the sensing device, a second value of the calibration parameter based on the particular temperature and a temperature compensation function corresponding to the calibration parameter; and selectively updating, by the sensing device, the temperature compensation function based on the first value and the second value.

According to some possible implementations, an angle sensor, may include one or more sensing elements, a memory, and one or more processors to: receive sensor data including a set of signal values and a set of temperature values corresponding to the set of signal values, where the set of signal values may correspond to a magnetic field present at the angle sensor; determine, based on the set of signal values, a first value of a calibration parameter associated with calibrating the angle sensor; identify, based on the set of temperature values, a particular temperature value associated with the first value of the calibration parameter; determine a second value of the calibration parameter based on the particular temperature value and a temperature compensation function associated with the calibration parameter; update the temperature compensation function based on a comparison of the first value and the second value; and store information associated with the temperature compensation function.

BRIEF DESCRIPTION OF THE DRAWINGS

FIGS. 4A and 4B are flow charts of an example process for updating a temperature compensation function associated with calibrating an angle sensor using a backend calibration technique.

DETAILED DESCRIPTION

Figure 1:
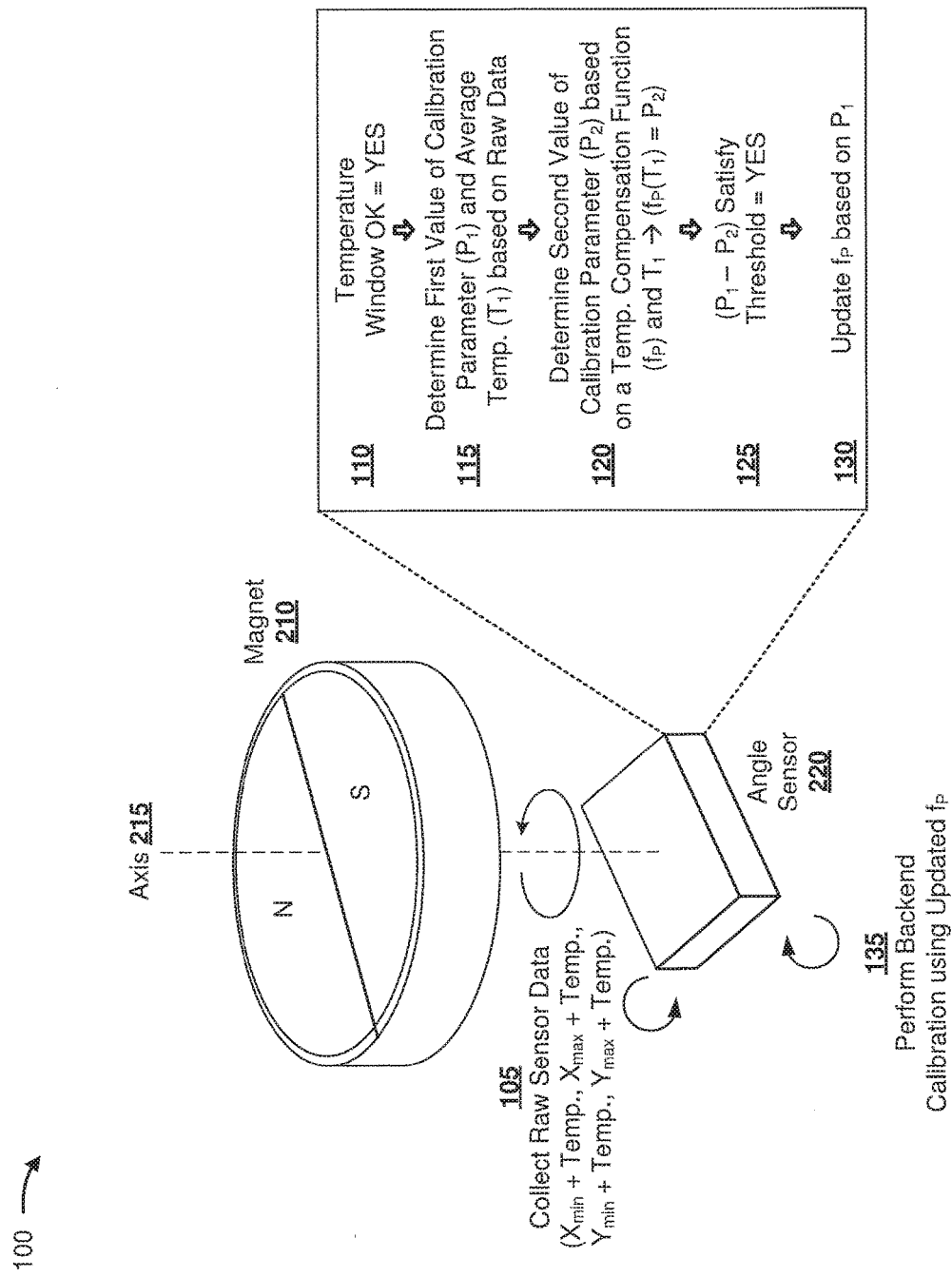
FIG. 1 is a diagram of an overview of an example implementation described herein.

The following detailed description of example implementations refers to the accompanying drawings. The same reference numbers in different drawings may identify the same or similar elements.

A magnetic angle sensor (herein referred to as an angle sensor) may be capable of performing automatic calibration (herein referred to as auto-calibration) in order to maintain and/or improve measurement accuracy over a lifetime of the angle sensor. For example, an angle sensor may auto-calibrate in order to remove lifetime drift and/or mismatch effects between a magnetic field, as sensed during initial calibration, and a magnetic field as sensed in an application setup. Furthermore, auto-calibration allows the angle sensor to avoid separate temperature compensation by continuously adapting to actual conditions present in the application, including changing temperature conditions.

However, auto-calibration may not be used when the angle sensor is implemented in an application in which full rotations (i.e., 360° rotations) of the magnetic field do not regularly occur. One such application is when measuring steering angles in an automobile since, for example, an automobile may travel (e.g., on a highway) for a significant amount of time without large changes in steering angle, and thus full rotations may not regularly occur. In such cases, the angle sensor may need to utilize a backend calibration and implement guard bands in order to account for the effect of calibration inaccuracies and parameter drifts. For example, upon manufacture of the angle sensor, the angle sensor may be configured with initial values for a set of calibration parameters, such as an offset parameter, a gain parameter, a phase parameter, a temperature coefficient, or the like. Here, the angle sensor may be calibrated (e.g., during use in an application) based on the initial values of the calibration parameters and a temperature as measured during use in the application. However, since the initial values of the calibration parameters are stored on the angle sensor early in the lifetime of the angle sensor (e.g., shortly after manufacture), temperature compensation may become less accurate over the lifetime of the angle sensor (e.g., due to aging effects of the angle sensor, the magnet, or the like). As such, the angle sensor may need to use guard bands in order to account for the effect of calibration inaccuracies and parameter drifts over the lifetime of the angle sensor.

Implementations described herein provide techniques for determining a set of temperature compensation functions associated with performing backend calibration of an angle sensor (e.g., when an auto-calibration technique is disabled or unavailable). In some implementations, the set of temperature compensation functions may be updated during the lifetime of the sensor (e.g., after initial calibration) based on collected sensor data, thereby allowing for improved accuracy of the backend calibration over the lifetime of the angle sensor and/or eliminating a need to employ a guard band associated with accounting for calibration inaccuracies and/or parameter drifts that may arise over the lifetime of the angle sensor.

FIG. 1 is a diagram of an overview of an example implementation 100 described herein. As shown by reference number 105 in FIG. 1, angle sensor 220 may collect raw sensor data including minimum and maximum values of a first signal (e.g., an x-signal corresponding to an x-component of a magnetic field) and a second signal (e.g., a y-signal corresponding to a y-component of the magnetic field). The minimum and maximum values are depicted as $X_{min}$, $X_{max}$, $Y_{min}$, and $Y_{max}$ in FIG. 1. As shown, the angle sensor may also collect temperature values corresponding to the minimum and maximum values.

As shown by reference number 110, angle sensor 220 may determine that whether a temperature window is satisfied (i.e., whether the temperature values are within a range of temperatures of a particular size). In some implementations, the temperature window may include information that identifies a range of allowable difference in temperature between any two items of the temperature data corresponding to the $X_{min}$, $X_{max}$, $Y_{min}$, and $Y_{max}$ values.

As shown by reference number 115, based on determining that the temperature values satisfy the temperature window, angle sensor 220 may determine a first value of calibration parameter ($P_1$) and an average temperature value ($T_1$) associated with the raw sensor data. In some implementations, the calibration parameter may include a parameter associated with calibrating angle sensor 220. For example, the calibration parameter may include an offset parameter associated with correcting an offset of the x-signal ($O_x$), a gain parameter associated with normalizing an amplitude of the x-signal ($A_x$), an offset parameter associated with correcting an offset of the y-signal ($O_y$), a gain parameter associated with normalizing an amplitude of the y-signal ($A_y$), a phase parameter associated with correcting a non-orthogonality error between the x-signal and the y-signal ($\varphi$), or the like.

In some implementations, angle sensor 220 may determine the first value of the calibration parameter based on the raw sensor data. For example, angle sensor 220 may determine the first value of $O_x$ as a value equal to an average of $X_{min}$ and $X_{max}$. Additionally, or alternatively, angle sensor 220 may determine the first value of $O_y$ as a value equal to an average of $Y_{min}$ and $X_{max}$. Additionally, or alternatively, angle sensor 220 may determine the first value of $A_X$ as a value equal to half of a difference between $X_{min}$ and $X_{max}$. Additionally, or alternatively, angle sensor 220 may determine the first value of $A_y$ as a value equal to half of a difference between $Y_{min}$ and $Y_{max}$. In some implementations, the first value of $\varphi$ may be determined based on comparing an angle corresponding to a zero-crossing of the x-signal and an angle corresponding to $Y_{min}$ and/or $Y_{max}$. Here, $\varphi$ may be determined as an angle that, when applied to the x-signal, causes a phase difference between the x-signal and the y-signal to be equal to 90°. In some implementations, angle sensor 220 may associate the average temperature ($T_1$) with the first value of the calibration parameter.

As shown by reference number 120, angle sensor 220 may determine a second value of calibration parameter ($P_2$) based on a temperature compensation function ($f_P$) and $T_1$. The temperature compensation function may include a function from which a value of a calibration parameter may be calculated based on a temperature. Here, the second value of the calibration parameter may include a value of the calibration parameter as calculated based on a temperature compensation function, associated with the calibration parameter, that is stored or accessible by angle sensor 220.

As shown by reference number 125, angle sensor 220 may determine that a difference between the first value and the second value satisfies a deviation threshold (e.g., $P_1-P_2$ satisfies the threshold=YES). The deviation threshold may include information that identifies a difference between the first value and the second value that, if satisfied, triggers angle sensor 220 to update a temperature compensation function associated with calibrating angle sensor 220.

As shown by reference number 130, angle sensor 220 may update the temperature compensation function ($f_P$) based on the first value ($P_1$). In some implementations, angle sensor 220 may update the temperature compensation function based on a polynomial approach or a piecewise function approach (as discussed in greater detail below with respect to FIG. 4B). Additionally, or alternatively, angle sensor 220 may update the temperature compensation function based on a spline function.

As shown by reference number 135, after updating the temperature compensation function, angle sensor 220 may use the temperature compensations to perform backend calibration of 220 (e.g., when auto-calibration is disabled or unavailable). As discussed above, the set of temperature compensation functions may be updated during the lifetime of the angle sensor 220 (e.g., after initial calibration) based on collected sensor data, thereby allowing for improved accuracy of the backend calibration over the lifetime of the angle sensor and/or eliminating a need to employ a guard band associated with accounting for calibration inaccuracies and/or parameter drifts that may arise over the lifetime of angle sensor 220.

As indicated above, FIG. 1 is provided merely as an example. Other examples are possible and may differ from what was described with regard to FIG. 1.

Figure 2:
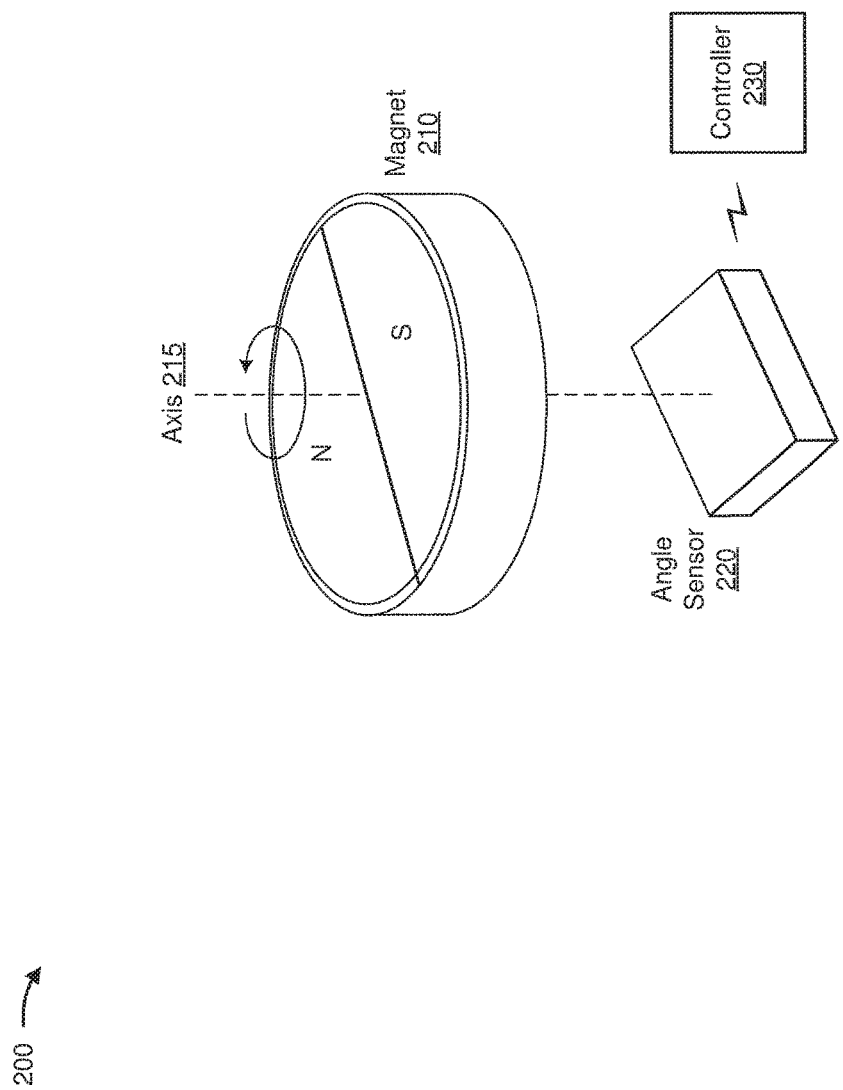
FIG. 2 is a diagram of an example environment in which systems and/or methods, described herein, may be implemented.

FIG. 2 is a diagram of an example environment 200 in which apparatuses described herein may be implemented. As shown in FIG. 2, environment 200 may include a magnet 210 that may rotate about an axis 215, an angle sensor 220, and a controller 230.

Magnet 210 includes one or more magnets positioned to rotate about axis 215 (e.g., an imaginary line). In some implementations, magnet 210 may be connected (e.g., mechanically) to a rotatable object (not shown) such that a rotation angle of magnet 210 corresponds to a rotation angle of the rotatable object (e.g., when there exists a non-slip relation between an end face of the rotatable object and magnet 210).

In the example environment 200 shown in FIG. 2, magnet 210 comprises a first half forming a north pole (N) and a second half forming a south pole (S), so that magnet 210 comprises one pole pair. In some implementations, magnet 210 may, without limitation, comprise more than one pole pair. In some implementations, magnet 210 may include a disk magnet that is positioned concentrically about axis 215 that passes through the center of magnet 210, as shown in FIG. 2. While magnet 210 is shown as circular in FIG. 2, magnet 210 may be another shape, such as a square, a rectangular, an ellipse, or the like. For example, magnet 210 may be of an elliptical shape in an instance where an angle between a plane corresponding to a surface of magnet 210 and axis 215 deviates from a substantially perpendicular relation. The plane may include a plane symmetrically cutting through magnet 210 and including a magnet center of magnet 210. In most practical cases, the plane may be substantially perpendicular to axis 215. As another example, magnet 210 may include a ring magnet that is positioned to rotate about axis 215 (along with the rotatable object). A ring magnet may be of interest for an arrangement of magnet 210 at an end of the rotatable object.

In some implementations, magnet 210 may include two alternating poles on two portions of magnet 210 (e.g., a north pole on a first half of magnet 210, a south pole on a second half of magnet 210). Additionally, or alternatively, magnet 210 may include a dipole magnet (e.g., a dipole bar magnet, a circular dipole magnet, an elliptical dipole magnet, etc.), a permanent magnet, an electromagnet, a magnetic tape, or the like. Magnet 210 may be comprised of a ferromagnetic material (e.g., Hard Ferrite), and may produce a magnetic field. Magnet 210 may further comprise a rare earth magnet which may be of advantage due to an intrinsically high magnetic field strength of rare earth magnets. As described above, in some implementations, magnet 210 may be attached to or coupled with a rotatable object for which a rotation angle may be determined (e.g., by angle sensor 220, by controller 230) based on a rotation angle of magnet 210.

Angle sensor 220 includes one or more sensing devices for detecting components of a magnetic field for use in determining an angle of rotation (e.g., of magnet 210, of a rotatable object to which magnet 210 is connected, etc.). For example, angle sensor 220 may include one or more circuits (e.g., one or more integrated circuits). In some implementations, angle sensor 220 may be placed at a position relative to magnet 210 such that angle sensor 220 may detect components of the magnetic field produced by magnet 210. In some implementations, angle sensor 220 may include an integrated circuit that includes an integrated controller 230 (e.g., such that an output of angle sensor 220 may include information that describes a rotation angle of magnet 210 and/or the rotatable object).

In some implementations, angle sensor 220 may include a group of sensing elements configured to sense amplitudes of components of the magnetic field, produced by magnet 210, that are present at angle sensor 220. Additionally, or alternatively, angle sensor 220 may include a temperature sensing element that allows angle sensor 220 to determine a temperature at or near angle sensor 220. Additional details regarding angle sensor 220 are described below with regard to FIG. 3.

Controller 230 includes one or more circuits associated with determining a rotation angle of magnet 210, and providing information associated with the rotation angle of magnet 210 and hence the rotation angle of the rotatable object to which magnet 210 is connected. For example, controller 230 may include one or more circuits (e.g., an integrated circuit, a control circuit, a feedback circuit, etc.). Controller 230 may receive input signals from one or more sensors, such as one or more angle sensors 220, may process the input signals (e.g., using an analog signal processor, a digital signal processor, etc.) to generate an output signal, and may provide the output signal to one or more other devices or systems. For example, controller 230 may receive one or more input signals from angle sensor 220, and may use the one or more input signals to generate an output signal comprising the angular position of magnet 210 and/or the rotatable object to which magnet 210 is connected.

The number and arrangement of apparatuses shown in FIG. 2 are provided as an example. In practice, there may be additional apparatuses, fewer apparatuses, different apparatuses, or differently arranged apparatuses than those shown in FIG. 2. Furthermore, two or more apparatuses shown in FIG. 2 may be implemented within a single apparatus, or a single apparatus shown in FIG. 2 may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
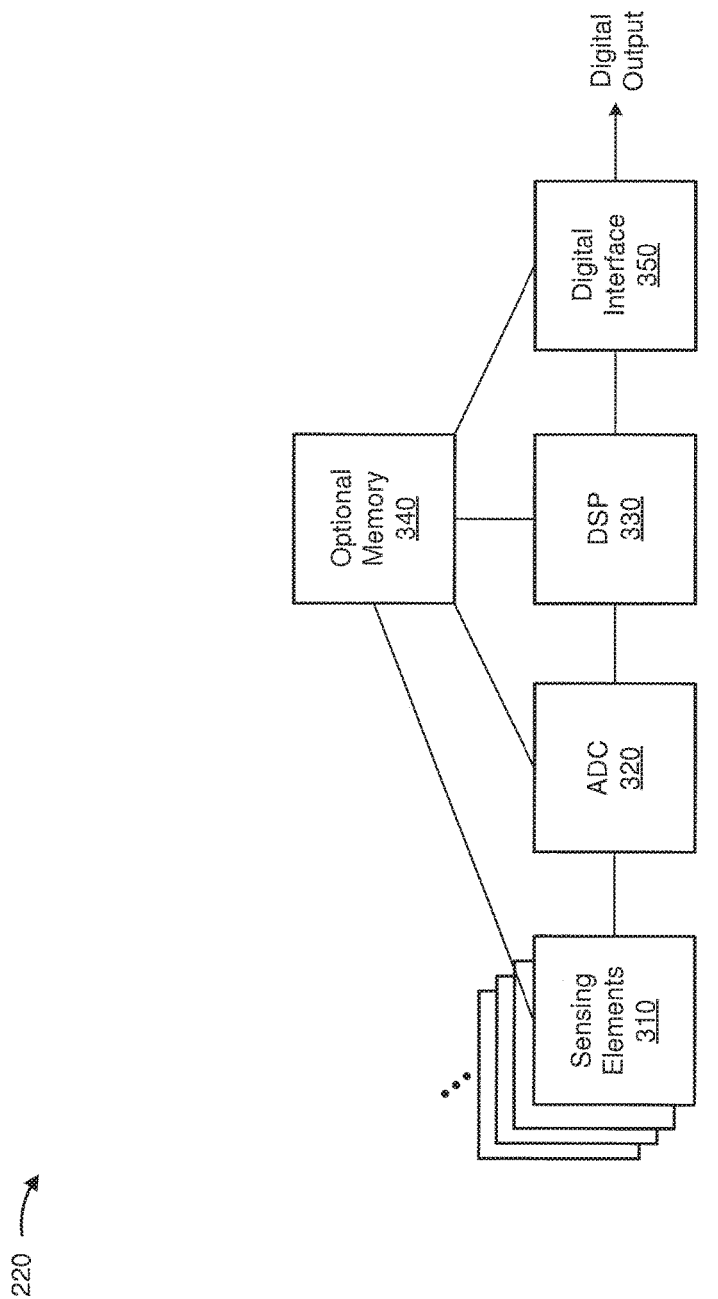
FIG. 3 is a diagram of example components of one or more devices of FIG. 2.

FIG. 3 is a diagram of example components of angle sensor 220 included in example environment 200 of FIG. 2. As shown, angle sensor 220 may include a group of sensing elements 310, an analog-to-digital convertor (ADC) 320, a digital signal processor (DSP) 330, an optional memory component 340, and a digital interface 350.

Sensing element 310 includes one or more apparatuses for sensing an amplitude of a component of a magnetic field present at angle sensor 220 (e.g., the magnetic field generated by magnet 210). For example, sensing element 310 may include a Hall sensor that operates based on a Hall-effect. As another example, sensing element 310 may include a MR sensor, comprised of a magnetoresistive material (e.g., nickel iron (NiFe)), where the electrical resistance of the magnetoresistive material may depend on a strength and/or a direction of the magnetic field present at the magnetoresistive material. Here, sensing element 310 may measure magnetoresistance based on an anisotropic magnetoresistance (AMR) effect, a giant magnetoresistance (GMR) effect, a tunnel magnetoresistance (TMR) effect, or the like. As an additional example, sensing element 310 may include a variable reluctance (VR) sensor that operates based on induction. In some implementations, sensing element 310 may include a temperature sensing element that is associated with measuring a temperature at or near angle sensor 220.

ADC 320 includes an analog-to-digital converter that converts an analog signal from the one or more sensing elements 310 to a digital signal. For example, ADC 320 may convert analog signals, received from the one or more sensing elements 310, into digital signals to be processed by DSP 330. ADC 320 may provide the digital signals to DSP 330. In some implementations, angle sensor 220 may include one or more ADCs 320.

DSP 330 includes a digital signal processing device or a collection of digital signal processing devices (i.e., one or more processors). In some implementations, DSP 330 may receive digital signals from ADC 320 and may process the digital signals to form output signals (e.g., destined for controller 230 as shown in FIG. 2), such as output signals associated with determining the rotation angle of magnet 210 rotating with a rotatable object. In some implementations, DSP 330 may include one or more processors, such as a central processing unit (CPU), an accelerated processing unit (APU), a microprocessor, a microcontroller, a field-programmable gate array (FPGA), an application-specific integrated circuit (ASIC), or another type of processing component.

Optional memory component 340 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by angle sensor 220. In some implementations, optional memory component 340 may store information associated with processing performed by DSP 330. In some implementations, angle sensor 220 may perform processes described herein in based on executing software instructions stored by a non-transitory computer-readable medium, such as optional memory component 340. A computer-readable medium is defined herein as a non-transitory memory device. Additionally, or alternatively, optional memory component 340 may store configurational values or parameters for sensing elements 310 and/or information for one or more other components of angle sensor 220, such as ADC 320 or digital interface 350.

Digital interface 350 includes an interface via which angle sensor 220 may receive and/or provide information from and/or to another device, such as controller 230 (see FIG. 2). For example, digital interface 350 may provide the output signal, determined by DSP 330, to controller 230 and may further receive information from the controller 230.

The number and arrangement of components shown in FIG. 3 are provided as an example. In practice, angle sensor 220 may include additional components, fewer components, different components, or differently arranged components than those shown in FIG. 3. Additionally, or alternatively, a set of components (e.g., one or more components) of angle sensor 220 may perform one or more functions described as being performed by another set of components of angle sensor 220.

Figure 4B:
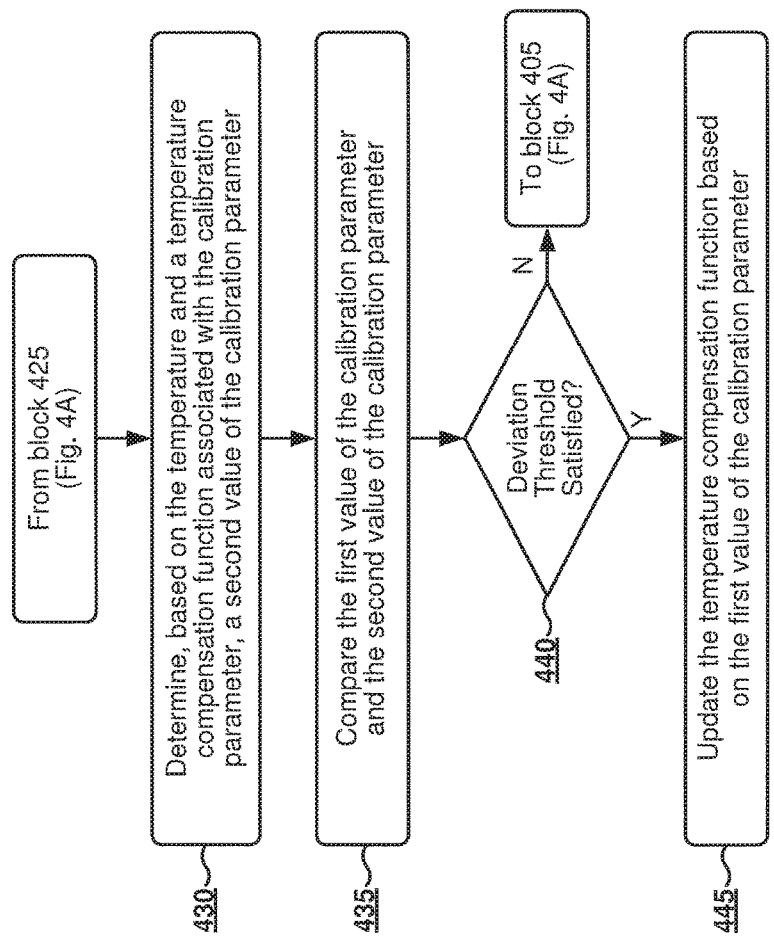

FIGS. 4A and 4B are flow charts of an example process 400 for updating a temperature compensation function associated with calibrating angle sensor 220 using a backend calibration technique. In some implementations, one or more process blocks of process 400 may be performed by angle sensor 220. In some implementations, one or more process blocks of process 400 may be performed by another device or a group of devices separate from or including angle sensor 220, such as controller 230.

As shown in FIG. 4A, process 400 may include obtaining raw sensor data including minimum and maximum values of a first signal and a second signal, and temperature data corresponding to the minimum and maximum values (block 405). For example, angle sensor 220 may obtain raw sensor data including minimum and maximum values of a first signal and a second signal, and temperature data corresponding to the minimum and maximum values.

In some implementations, the raw sensor data may include minimum and maximum values of a first signal and a second signal (e.g., voltage signals, current signals) generated by angle sensor 220 based on a magnetic field produced by magnet 210. For example, the raw sensor data may include a minimum value and a maximum value x-signal (e.g., a cosine signal) that corresponds to an x-component of a magnetic field present at angle sensor 220. These values may be referred to as $X_{min}$ and $X_{max}$, respectively. Similarly, the raw sensor data may include a minimum value and a maximum value of a y-signal (e.g., a sine signal) that corresponds to a y-component of the magnetic field present at angle sensor 220. These values may be referred to as $Y_{min}$ and $Y_{max}$, respectively. In some implementations, the raw sensor data may also include data associated with a zero-crossing of the x-signal and/or the y-signal.

In some implementations, the raw sensor data may also include temperature data corresponding to $X_{min}$, $X_{max}$, $Y_{min}$, and $Y_{max}$ values. For example, angle sensor 220 may include sensing element 310 that allows angle sensor 220 to determine a temperature at or near angle sensor 220. Here, during rotation of magnet 210, angle sensor 220 may determine a temperature corresponding to $X_{min}$, $X_{max}$, $Y_{min}$, and $Y_{max}$ values (e.g., a temperature at or near angle sensor 220 at a time when angle sensor 220 obtains each value).

In some implementations, the raw sensor data may also include time data corresponding to $X_{min}$, $X_{max}$, $Y_{min}$, and $Y_{max}$ values. For example, angle sensor 220 may include a clock that allows angle sensor 220 to determine times (e.g., down to tenths of a second, hundredths of a second) at which $X_{min}$, $X_{max}$, $Y_{min}$, and $Y_{max}$ values are obtained. In some implementations, the time data may include a time of day, a time as measured from a particular point (e.g., a start time of a timer), or the like.

In some implementations, angle sensor 220 may obtain the raw sensor data during a rotation of magnet 210. For example, magnet 210 may rotate around axis 215, and angle sensor 220 may obtain the raw sensor data during the rotation. In some implementations, angle sensor 220 may determine that angle sensor 220 has obtained $X_{min}$, $X_{max}$, $Y_{min}$, and $Y_{max}$ values (e.g., that magnet 210 has performed a full rotation) before proceeding with process 400. For example, angle sensor 220 may determine a series of values of the x-signal, and may compare adjacent (e.g., adjacent in time) signal values in order to determine whether angle sensor 220 has obtained an $X_{max}$ value (e.g., when a first-in-time x-signal value is less than a second-in-time x-signal value, and a third-in-time x-signal value is less than the second-in-time x-signal value) and an $X_{min}$ value (e.g., when a fourth-in-time x-signal value is greater than a fifth-in-time x-signal value, and a sixth-in-time x-signal value is greater than the fifth-in-time x-signal value). Angle sensor 220 may determine whether angle sensor 220 has obtained $Y_{min}$ and $Y_{max}$ values in a similar manner.

As further shown in FIG. 4A, process 400 may include determining, based on the raw sensor data, whether a temperature window is satisfied (block 410). For example, angle sensor 220 may determine whether a temperature window is satisfied. In some implementations, angle sensor 220 may determine whether the temperature data satisfies the temperature window based on obtaining the raw sensor data that includes $X_{min}$, $X_{max}$, $Y_{min}$, and $Y_{max}$ values.

The temperature window may include information that identifies a maximum allowable difference in temperature between any two items of the temperature data, corresponding to $X_{min}$, $X_{max}$, $Y_{min}$, and $Y_{max}$ values, in order to proceed with updating a temperature compensation function associated with calibrating angle sensor 220. For example, the temperature window may be a 0.50° Celsius (C) temperature window (e.g., requiring the items of temperature data to be within 0.50° C. of one another), a 2.0° C. temperature window (e.g., requiring the items of temperature data to be within 2.0° C. of one another), or the like. In some implementations, the temperature window may be configurable on angle sensor 220.

In some implementations, the temperature window ensures that an update to the temperature compensation function, based on $X_{min}$, $X_{max}$, $Y_{min}$, and $Y_{max}$ values, is not negatively impacted due to a significant difference in temperature between the $X_{min}$, $X_{max}$, $Y_{min}$, and $Y_{max}$ values (e.g., where a change in temperature may reduce accuracy of a calculated calibration parameter). In some implementations, angle sensor 220 may determine whether the temperature window is satisfied based on the temperature data corresponding to $X_{min}$, $X_{max}$, $Y_{min}$, and $Y_{max}$ values. For example, angle sensor 220 may determine a difference between temperatures associated with each value (e.g., $|T_{Xmin}-T_{Xmax}|$, $|T_{Xmin}-T_{Ymin}|$, $|T_{Xmin}-T_{Ymax}|$, $|T_{Xmax}-$ $T_{Ymin}|$, $|T_{Xmax}-T_{Ymax}|$, and $|T_{Ymin}-T_{Ymax}|$) and may determine whether each difference is within the temperature window.

As further shown in FIG. 4A, if the temperature window is not satisfied (block 410—NO), then process 400 may include obtaining raw sensor data including minimum and maximum values of a first signal and a second signal, and temperature data corresponding to the minimum and maximum values (block 405). For example, angle sensor 220 may determine that the temperature window is not satisfied, and may return to block 405 and proceed to obtain additional raw sensor data, as described above.

As further shown in FIG. 4A, if the temperature window is satisfied (block 410—YES), then process 400 may include determining, based on the raw sensor data, whether a time window is satisfied (block 415). For example, angle sensor 220 may determine whether a time window is satisfied. In some implementations, angle sensor 220 may determine whether the time data satisfies the time window based on obtaining the raw sensor data that includes $X_{min}$, $X_{max}$, $Y_{min}$, and $Y_{max}$ values. Additionally, or alternatively, angle sensor 220 may determine whether the time data satisfies the time window based on determining that the temperature data satisfies the temperature window.

The time window may include information that identifies a maximum allowable time difference between any two items of the time data, corresponding to $X_{min}$, $X_{max}$, $Y_{min}$, and $Y_{max}$ values, in order to proceed with updating a temperature compensation function associated with calibrating angle sensor 220. For example, the time window may be a 0.5 second (s) time window (e.g., requiring the items of time data to be within 0.5 s of one another), a 2.0 s time window (e.g., requiring the items of time data to be within 2.0 s of one another), or the like. In some implementations, the time window may be configurable on angle sensor 220.

In some implementations, the time window ensures that an update to the temperature compensation function, based $X_{min}$, $X_{max}$, $Y_{min}$, and $Y_{max}$ values, is not negatively impacted due a significant difference in time between the $X_{min}$, $X_{max}$, $Y_{min}$, and $Y_{max}$ values. In some implementations, angle sensor 220 may determine whether the time window is satisfied based on the time data corresponding to $X_{min}$, $X_{max}$, $Y_{min}$, and $Y_{max}$ values. For example, angle sensor 220 may determine a difference between a time associated with each value, and determine whether each difference is within the time window. In some implementations, a determination of whether the time window is satisfied is optional (i.e., angle sensor 220 may proceed from block 410 to block 420 without performing block 415).

As further shown in FIG. 4A, if the time window is not satisfied (block 415—NO), then process 400 may include obtaining raw sensor data including minimum and maximum values of a first signal and a second signal, and temperature data corresponding to the minimum and maximum values (block 405). For example, angle sensor 220 may determine that the time window is not satisfied, and may return to block 405 and proceed to obtain raw sensor data, as described above.

As further shown in FIG. 4A, if the time window is satisfied (block 415—YES), then process 400 may include determining, based on the raw sensor data, a first value of a calibration parameter (block 420). For example, angle sensor 220 may determine a first value of a calibration parameter. In some implementations, angle sensor 220 may determine the first value of the calibration parameter when (e.g., after) angle sensor 220 determines that the time window is satisfied. Additionally, or alternatively, angle sensor 220 may determine the first value of the calibration when angle sensor 220 determines that the temperature window is satisfied.

The calibration parameter may include a parameter associated with calibrating angle sensor 220. For example, the calibration parameter may include an offset parameter associated with correcting an offset of the x-signal ($O_x$), a gain parameter associated with normalizing an amplitude of the x-signal ($A_x$), an offset parameter associated with correcting an offset of the y-signal ($O_y$), a gain parameter associated with normalizing an amplitude of the y-signal ($A_y$), a phase parameter associated with correcting a non-orthogonality error between the x-signal and the y-signal ($\varphi$), a combination of any or all of the preceding, or the like.

In some implementations, angle sensor 220 may determine the first value of the calibration parameter based on the raw sensor data. For example, angle sensor 220 may determine the first value of $O_x$ as a value equal to an average of $X_{min}$ and $X_{max}$. Additionally, or alternatively, angle sensor 220 may determine the first value of $O_y$ as a value equal to an average of $Y_{min}$ and $X_{max}$. Additionally, or alternatively, angle sensor 220 may determine the first value of $A_X$ as a value equal to half of a difference between the $X_{min}$ and $X_{max}$. Additionally, or alternatively, angle sensor 220 may determine the first value of $A_y$ as a value equal to half of a difference between the $Y_{min}$ and $X_{max}$. In some implementations, the first value of $\varphi$ may be determined based on comparing an angle corresponding to a zero-crossing of the x-signal and an angle corresponding to $Y_{min}$ and/or $Y_{max}$. Here, $\varphi$ may be determined as an angle that, when applied to the x-signal, causes a phase difference between the x-signal and the y-signal to be equal to 90°. Notably, the above techniques for determining the first values of the calibration parameters are merely examples, and different techniques may be used.

In some implementations, angle sensor 220 may determine first values of one or more calibration parameters. Notably, while implementations described herein are described in the context of determining the calibration parameters as described above, other techniques exist for determining calibration parameters associated with calibrating an angle sensor, any of which may be applied to techniques described herein.

As further shown in FIG. 4A, process 400 may include associating a temperature with the first value of the calibration parameter (block 425). For example, angle sensor 220 may associate a particular temperature (e.g., a particular temperature value) with the first value of the calibration parameter. In some implementations, angle sensor 220 may associate a temperature with the first value of the calibration parameter based on determining the first value of the calibration parameter.

In some implementations, angle sensor 220 may associate an average temperature with the first value of the calibration parameter. For example, angle sensor 220 may determine an average temperature of the temperatures identified by temperature data corresponding to $X_{min}$, $X_{max}$, $Y_{min}$, and $Y_{max}$ values. Here, angle sensor 220 may associate the average temperature with the first value of the calibration parameter. Additionally, or alternatively, angle sensor 220 may associate a median of temperature data, a mode of the temperature data, a highest of temperature data, a lowest of temperature data, or the like, with the first value of the calibration parameter.

As shown in FIG. 4B, process 400 may include determining, based on the temperature and a temperature compensation function associated with the calibration parameter, a second value of the calibration parameter (block 430). For example, angle sensor 220 may determine, based on the temperature and a temperature compensation function associated with the calibration parameter, a second value of the calibration parameter. In some implementations, angle sensor 220 may determine the second value of the calibration parameter based on associating the temperature with the first value of the calibration parameter.

The second value of the calibration parameter may include a value of the calibration parameter as calculated based on a temperature compensation function stored or accessible by angle sensor 220. The temperature compensation function may include a function from which a value of a calibration parameter may be calculated based on a temperature. For example, the temperature compensation function may include a polynomial function, a piecewise linear function, a spline function, or the like, that receives a temperature as input and provides, as an output, a value of the calibration parameter.

In some implementations, angle sensor 220 may store information associated with the temperature compensation function. For example, during initial calibration, angle sensor 220 may be configured with a temperature compensation function associated with the calibration parameter. In some implementations, angle sensor 220 may update the temperature compensation function (as described below), and store information associated with the updated temperature compensation function such that angle sensor 220 may calibrate angle sensor 220, at a later time, using a backend calibration technique (e.g., based on the updated temperature compensation function). In some implementations, angle sensor 220 may store information associated with multiple temperature compensation functions corresponding to multiple calibration parameters (e.g., $O_x$, $O_y$, $A_x$, $A_y$, and/or $\varphi$).

In some implementations, angle sensor 220 may determine the second value of the calibration parameter by providing information associated with the average temperature, associated with the first value of the calibration parameter, as an input to the temperature compensation function, and receiving, as an output, the second value of the calibration parameter. Additionally, or alternatively, angle sensor 220 may determine the second value of the calibration parameter based on a lookup table corresponding to the calibration parameter (e.g., when the lookup table stores values of the calibration parameter corresponding to different temperatures). In some implementations, angle sensor 220 may extrapolate between two or more values in the lookup table in order to determine the second value of the calibration parameter.

In some implementations, angle sensor 220 may determine second values of one or more calibration parameters. For example, angle sensor 220 may determine second values of $O_x$, $O_y$, $A_x$, $A_y$, and/or $\varphi$ based on a respective temperature compensation function, corresponding to each calibration parameter, stored by angle sensor 220.

As further shown in FIG. 4B, process 400 may include comparing the first value of the calibration parameter and the second value of the calibration parameter (block 435) and determining, based on comparing the first value and the second value, whether a deviation threshold is satisfied (block 440). For example, angle sensor 220 may compare the first value of the calibration parameter and the second value of the calibration parameter and determine whether a deviation threshold is satisfied (e.g., whether a difference between the first value and the second value is above, is greater than, is greater than or equal to, or the like, a value representing the deviation threshold). In some implementations, angle sensor 220 may compare the first value and the second value after angle sensor 220 determines the first value of the calibration parameter and the second value of the calibration parameter.

The deviation threshold may include information that identifies a difference between the first value and the second value that, if satisfied, triggers angle sensor 220 to update a temperature compensation function associated with calibrating angle sensor 220. For example, the deviation threshold may include a minimum difference, a percentage difference, or the like. In some implementations, the deviation threshold may be configurable on angle sensor 220. If satisfied, angle sensor 220 may proceed with updating the temperature compensation function (i.e., may proceed with process 400). In some implementations, determination of whether the deviation threshold is satisfied is optional (i.e., angle sensor 220 may proceed to block 445 without performing blocks 435 and 440)

As further shown in FIG. 4B, if the deviation threshold is not satisfied (block 440—NO), then process 400 may include obtaining raw sensor data including minimum and maximum values of a first signal and a second signal, and temperature data corresponding to the minimum and maximum values (block 405). For example, angle sensor 220 may determine that the deviation threshold is not satisfied, and may return to block 405 and proceed to obtain additional raw sensor data, as described above. Here, a deviation that does not satisfy the deviation threshold may indicate that the temperature compensation function can be reliably used to determine a value of the calibration parameter.

As further shown in FIG. 4A, if the deviation threshold is satisfied (block 440—YES), then process 400 may include updating the temperature compensation function based on the first value of the calibration parameter (block 445). For example, angle sensor 220 may update the temperature compensation function based on the first value of the calibration parameter. In some implementations, angle sensor 220 may update the temperature compensation function after determining that the deviation threshold is satisfied. Additionally, or alternatively, angle sensor 220 may update the temperature compensation function after angle sensor 220 determines the second value of the calibration parameter. In some implementations, angle sensor 220 may update the temperature compensation function based on the first value of the calibration parameter.

Figure 5A:
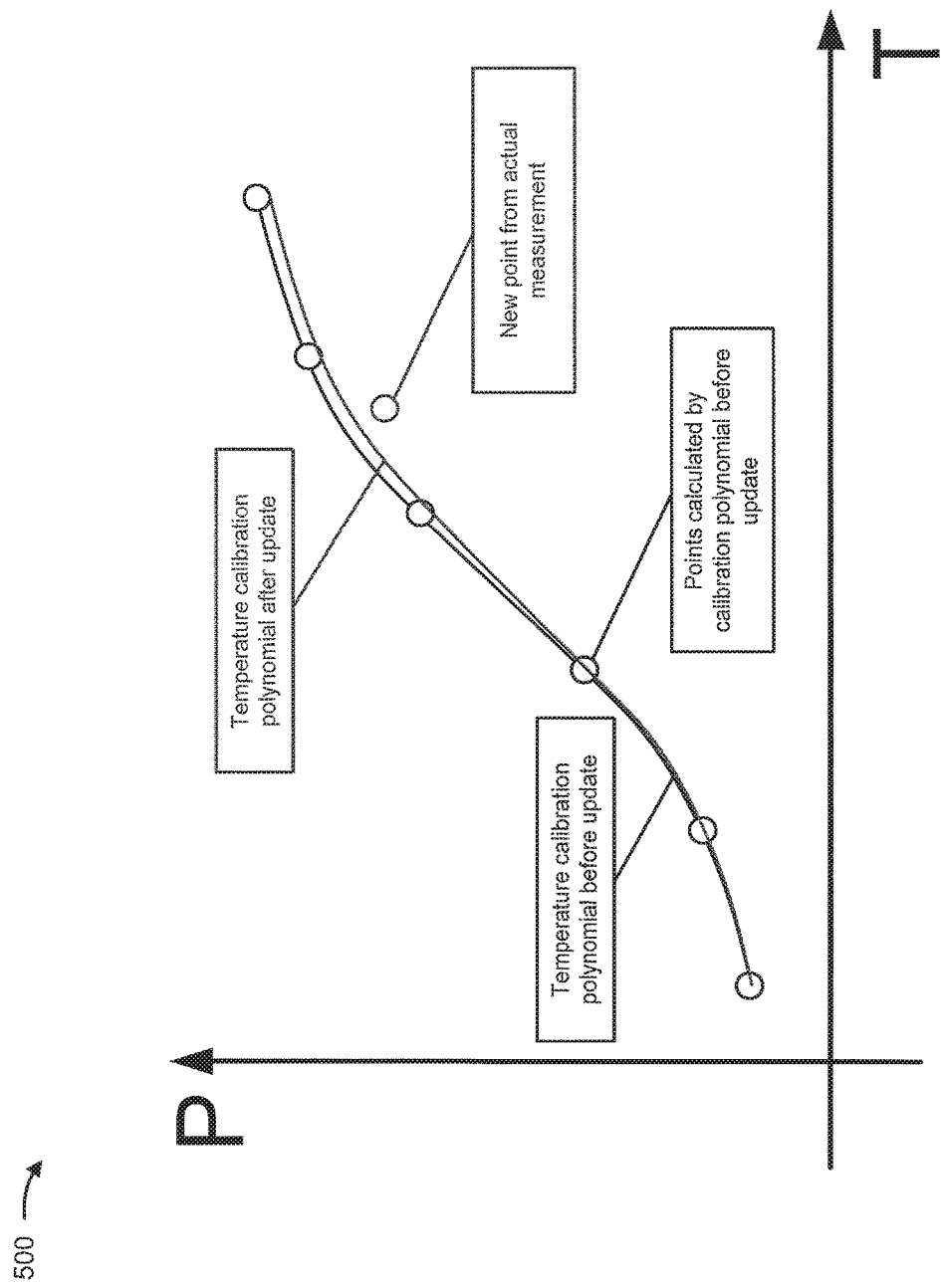
FIGS. 5A and 5B are diagrams of example implementations relating to the example process shown in FIGS. 4A and 4B.

FIG. 5A is a diagram of an example associated with updating a polynomial temperature compensation function. As shown in FIG. 5A, angle sensor 220 may calculate a set of N calibration points according to the temperature compensation function. Here, the set of N calibration points may be distributed (e.g., equally) over a temperature range associated with angle sensor 220. As further shown, angle sensor 220 may add a point associated with the first value of the calibration parameter (e.g., at the associated temperature) and recalculate a coefficient of the polynomial (e.g., using a polynomial regression technique). Here, the additional point may affect the temperature compensation function near the corresponding temperature. For example, as shown in FIG. 5A, the calibration point associated with the first value may pull the line, associated with the temperature compensations function, down toward the point associated with the first value. In some implementations, the number of N calibration points may be configured in order to control an impact of an additional point on the temperature compensation function.

As indicated above, FIG. 5A is provided merely as an example. Other examples are possible and may differ from what was described with regard to FIG. 5A.

Figure 5B:
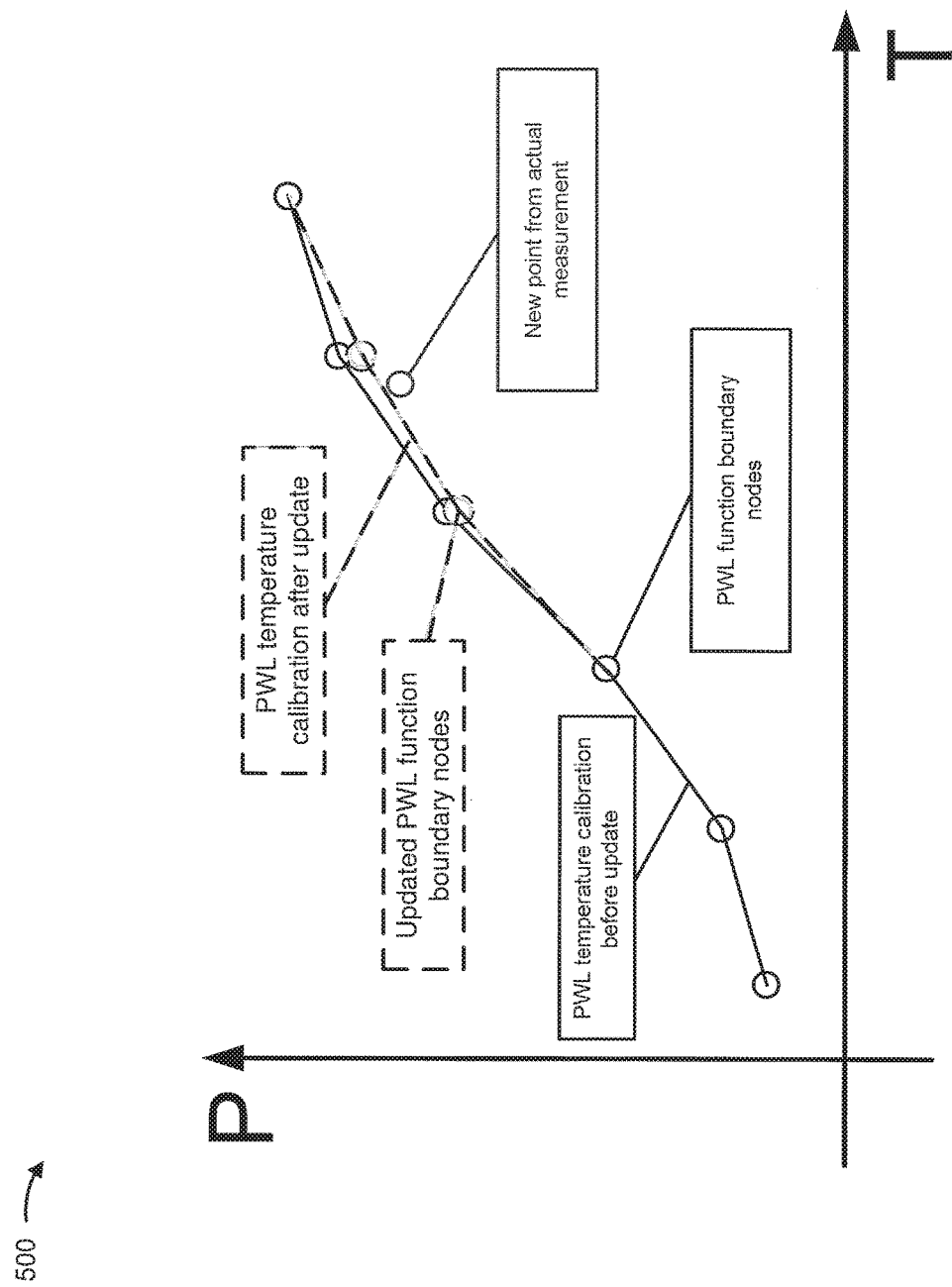

FIG. 5B is a diagram of an example associated with updating a piecewise linear (PWL) temperature compensation function. As shown in FIG. 5B, angle sensor 220 may calculate a set of line segments, defined by boundary nodes, according to the temperature compensation function. As further shown, angle sensor 220 may add a point associated with the first value of the calibration parameter (e.g., at the associated temperature) and recalculate the piecewise function. For example, angle sensor 220 may calculate a difference between a line segment of the piecewise function, associated with the first value, and move boundary nodes, associated with the line segment, by a particular amount (e.g., 10% of the calculated difference) toward the first value (e.g., downward as shown in FIG. 5B). Optionally, angle sensor 220 may move the boundary nodes by a fraction reciprocal to a temperature of a neighboring boundary node in order to cause boundary nodes closer to the added point to move further relative to other boundary nodes.

In some implementations, after updating the temperature compensation function, information associated with the temperature compensation functions may be written to a memory component of angle sensor 220 (e.g., a non-volatile memory). In some implementations, the previous information associated with the temperature compensation functions may be maintained (e.g., stored in the memory component without being overwritten or deleted) until success of the write procedure has been verified (e.g., by reading the new data back including a cyclic redundancy check (CRC) and comparing with the extracted data) in order to ensure that the original temperature compensation function is available in the event that the write operations fails (e.g., due to a power failure associated with angle sensor 220, due to a transient disturbance associated with angle sensor 220, or the like).

In some implementations, the update of the temperature compensation function may be performed only if relevance of the deviation threshold, associated with the temperature compensation function, is satisfied a threshold number of times (e.g., such that angle sensor 220 updates the temperature compensation function only when a threshold number of deviations are detected).

In some implementations, the update of the temperature compensation function may be performed one or more times, and the transfer to the non-volatile memory component may be performed when the temperature compensation function is significantly modified. For example, angle sensor 220 may update the temperature compensation function, as described above, but may write the updated temperature compensation function to the non-volatile memory only when a change to the temperature compensation function satisfies a threshold (e.g., when a change to a coefficient of the temperature compensation function is greater than a threshold value or greater than a particular percentage change). Here, the determination of the difference between the first value and the second value may not be performed (i.e., angle sensor 220 may skip blocks 435 and 440) since angle sensor 220 determines whether to store the updated temperature compensation function later after updating the temperature compensation function. In some implementations, skipping blocks 435 and 440 may allow for conservation of resources of angle sensor 220 (e.g., processing resources, power, or the like).

In some implementations, after updating the temperature compensation function, angle sensor 220 may use the temperature compensation function to perform backend calibration of angle sensor 220. As discussed above, the temperature compensation function may be updated during the lifetime of the angle sensor 220 (e.g., after initial calibration) based on collected sensor data, thereby allowing for improved accuracy of the backend calibration over the lifetime of the angle sensor and/or eliminating a need to employ a guard band associated with accounting for calibration inaccuracies and/or parameter drifts that may arise over the lifetime of angle sensor 220.

Although FIG. 4 shows example blocks of process 400, in some implementations, process 400 may include additional blocks, fewer blocks, different blocks, or differently arranged blocks than those depicted in FIG. 4. For example, one or more blocks of process 400 may be performed at a different point during process 400 than illustrated in FIGS. 4A and 4B. As a particular example, the determination of whether the temperature window is satisfied (block 410) and/or the determination of whether the time window is satisfied (block 415) may be performed immediately before the updating of the temperature compensation function (block 445), immediately after the comparison of the first value and the second value of the calibration parameter, or at another point during process 400.

Additionally, or alternatively, two or more of the blocks of process 400 may be performed in parallel. Further, while process 400 is described as being performed by angle sensor 220, in some implementations, one or more, or all, blocks of process 400 may be performed by controller 230.

As discussed above, the set of temperature compensation functions may be updated during the lifetime of the angle sensor 220 (e.g., after initial calibration) based on collected sensor data, thereby allowing for improved accuracy of the backend calibration over the lifetime of the angle sensor and/or eliminating a need to employ a guard band associated with accounting for calibration inaccuracies and/or parameter drifts that may arise over the lifetime of angle sensor 220.

The foregoing disclosure provides illustration and description, but is not intended to be exhaustive or to limit the implementations to the precise form disclosed. Modifications and variations are possible in light of the above disclosure or may be acquired from practice of the implementations.

For example, while the techniques described herein may be described in the context of an angle sensor used to determine an orientation of a magnetic field (e.g., an angle between zero degrees and three hundred and sixty degrees), these techniques may equally apply in contexts associated with one or more other type of sensor, such as a (e.g., magnetic) speed sensor used to determine a rotational speed of a rotatable object.

As a particular example, a speed sensor may include one or more sensing elements, a memory, and one or more processors to: receive sensor data including a set of signal values and a set of temperature values corresponding to the set of signal values, where the set of signal values may correspond to a magnetic field present at the speed sensor; determine, based on the set of signal values, a first value of a calibration parameter associated with calibrating the speed sensor; identify, based on the set of temperature values, a particular temperature value associated with the first value of the calibration parameter; determine a second value of the calibration parameter based on the particular temperature value and a temperature compensation function associated with the calibration parameter; update the temperature compensation function based on a comparison of the first value and the second value; and store information associated with the temperature compensation function.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a sensing device configured to sense a magnetic field present at the sensing device and collect raw sensor data based on the magnetic field; and
   one or more processors to:
      obtain the raw sensor data, collected by the sensing device, including a set of signal values and a set of temperature values corresponding to the set of signal values,
         the set of signal values corresponding to the magnetic field;
      determine, based on the set of signal values, a first value of a calibration parameter associated with calibrating the sensing device;
      associate, based on the set of temperature values, a particular temperature value with the first value of the calibration parameter;
      determine, based on the particular temperature value and a temperature compensation function associated with the calibration parameter, a second value of the calibration parameter; and
      selectively update the temperature compensation function for use with the sensing device based on a comparison of the first value and the second value,
         where the one or more processors, when selectively updating the temperature compensation function based on the comparison of the first value and the second value, are to:
            calculate a difference between the first value and the second value, and
            update the temperature compensation function when the difference between the first value and the second value satisfies a deviation threshold.

2. The device of claim 1, where the set of signal values includes a minimum value of a first signal corresponding to a first component of the magnetic field, a maximum value of the first signal, a minimum value of a second signal corresponding to a second component of the magnetic field, and a maximum value of the second signal.

3. The device of claim 1, where the one or more processors are further to:
   determine, based on the set of temperature values, that a temperature window is satisfied; and
   where the one or more processors, when selectively updating the temperature compensation function, are to:
      selectively update the temperature compensation function based on determining that the temperature window is satisfied.

4. The device of claim 1, where the one or more processors are further to:
   obtain information that identifies a set of times corresponding to the set of signal values;
   determine, based on the information that identifies the set of times, that a time window is satisfied; and
   where the one or more processors, when selectively updating the temperature compensation function, are to:
      selectively update the temperature compensation function based on determining that the time window is satisfied.

5. The device of claim 1, where the particular temperature value is an average temperature value of the set of temperature values, a median value of the set of temperature values, or a mode temperature value of the set of temperature values.

6. The device of claim 1, where the one or more processors are further to:
   cause stored information associated with the temperature compensation function to be maintained in a non-volatile memory component until success of a write procedure, associated with updating the temperature compensation function, has been verified.

7. The device of claim 1, where the temperature compensation function is a polynomial function, a piecewise linear function, or a spline function.

8. A method, comprising:
   obtaining, by a sensing device, a set of signal values and a set of temperatures corresponding to the set of signal values,
      the sensing device being configured to sense a magnetic field present at the sensing device and collect sensor data based on the magnetic field,
      the set of signal values and the set of temperatures being included in the sensor data collected by the sensing device, and
      the set of signal values corresponding to one or more components of the magnetic field present at the sensing device;
   determining, by the sensing device and based on the set of signal values, a first value of a calibration parameter associated with calibrating the sensing device;
   associating, by the sensing device and based on the set of temperatures, a particular temperature with the first value of the calibration parameter;
   calculating, by the sensing device, a second value of the calibration parameter based on the particular temperature and a temperature compensation function corresponding to the calibration parameter; and
   selectively updating, by the sensing device, the temperature compensation function for use with the sensing device based on the first value and the second value, where selectively updating the temperature compensation function based on the first value and the second value comprises:
calculating a difference between the first value and the second value; and
updating the temperature compensation function when the difference between the first value and the second value is above a deviation threshold.

9. The method of claim 8, where the set of signal values includes a minimum value and a maximum value of a first signal corresponding to a first component of the magnetic field, and a minimum value and a maximum value of a second signal corresponding to a second component of the magnetic field.

10. The method of claim 8, further comprising:
determining, based on the set of temperatures, that a temperature window is satisfied; and
where selectively updating the temperature compensation function comprises:
selectively updating the temperature compensation function based on determining that the temperature window is satisfied.

11. The method of claim 8, further comprising:
obtaining information that identifies a set of times corresponding to the set of signal values;
determining, based on the information that identifies the set of times, that a time window is satisfied; and
where selectively updating the temperature compensation function comprises:
selectively updating the temperature compensation function based on determining that the time window is satisfied.

12. The method of claim 8, further comprising:
causing stored information associated with the temperature compensation function to be maintained in a non-volatile memory component until success of a write procedure, associated with updating the temperature compensation function, has been verified.

13. The method of claim 8, where the temperature compensation function is a polynomial function, a piecewise linear function, or a spline function.

14. The method of claim 8, where the calibration parameter is an offset parameter associated with calibrating the sensing device, a gain parameter associated with calibrating the sensing device, or a phase parameter associated with calibrating the sensing device.

15. An angle sensor, comprising:
one or more sensing elements configured to sense a magnetic field present at the angle sensor and collect sensor data based on the magnetic field;
a memory; and
one or more processors to:
receive the sensor data including a set of signal values and a set of temperature values corresponding to the set of signal values,
the set of signal values corresponding to the magnetic field present at the angle sensor;
determine, based on the set of signal values, a first value of a calibration parameter associated with calibrating the angle sensor;
identify, based on the set of temperature values, a particular temperature value associated with the first value of the calibration parameter;
determine a second value of the calibration parameter based on the particular temperature value and a temperature compensation function associated with the calibration parameter;
update the temperature compensation function for use with the angle sensor based on a comparison of the first value and the second value,
where the one or more processors, when updating the temperature compensation function, are to:
calculate a difference between the first value and the second value;
determine that the difference satisfies a deviation threshold; and
update the temperature compensation function based on
determining that that the difference satisfies a deviation threshold; and store information associated with the temperature compensation function.

16. The angle sensor of claim 15, where the one or more processors are further to:
determine, based on the set of temperature values, that a temperature window is satisfied; and
where the one or more processors, when updating the temperature compensation function, are to:
update the temperature compensation function based on the temperature window being satisfied.

17. The angle sensor of claim 15, where the one or more processors are further to:
obtain information that identifies a set of times corresponding to the set of signal values;
determine, based on the information that identifies the set of times, that a time window is satisfied; and
where the one or more processors, when updating the temperature compensation function, are to:
update the temperature compensation functionbased on the time window being satisfied.

18. The device of claim 1, where the one or more processors, when determining the second value of the calibration parameter, are to:
determine the second value of the calibration parameter based on extrapolating between two or more values in a lookup table that stores values of the calibration parameter corresponding to different temperatures.

19. The method of claim 8, where determining the second value of the calibration parameter, comprises:
determining the second value of the calibration parameter based on extrapolating between two or more values in a lookup table that stores values of the calibration parameter corresponding to different temperatures.

20. The angle sensor of claim 15, where the one or more processors, when determining the second value of the calibration parameter, are to:
determine the second value of the calibration parameter based on extrapolating between two or more values in a lookup table that stores values of the calibration parameter corresponding to different temperatures.

* * * * *